(12) United States Patent
Wenzel et al.

(10) Patent No.: US 11,541,582 B2
(45) Date of Patent: Jan. 3, 2023

(54) DEVICE FOR SHAPING AN ELONGATED COMPONENT

(71) Applicant: LEONi KABEL GMBH, Roth (DE)

(72) Inventors: Joerg Wenzel, Roth (DE); Sebastian Goss, Roth (DE)

(73) Assignee: Leoni Kabel GmbH

( * ) Notice: Subject to any disclaimer, the term of this patent is extended or adjusted under 35 U.S.C. 154(b) by 0 days.

(21) Appl. No.: 17/058,023

(22) PCT Filed: Apr. 5, 2019

(86) PCT No.: PCT/EP2019/058648
§ 371 (c)(1),
(2) Date: Nov. 23, 2020

(87) PCT Pub. No.: WO2019/223926
PCT Pub. Date: Nov. 28, 2019

(65) Prior Publication Data
US 2021/0197430 A1 Jul. 1, 2021

(30) Foreign Application Priority Data

May 23, 2018 (DE) ..................... 10 2018 112 334.5

(51) Int. Cl.
*B29C 45/14* (2006.01)
*B29L 31/00* (2006.01)

(52) U.S. Cl.
CPC .. *B29C 45/14549* (2013.01); *B29C 45/14073* (2013.01); *B29L 2031/7542* (2013.01); *B29L 2031/7544* (2013.01)

(58) Field of Classification Search
None
See application file for complete search history.

(56) References Cited

U.S. PATENT DOCUMENTS 2,418,823 A * 4/1947 Desimone ......... B29C 45/14073
249/94
4,318,879 A * 3/1982 Gartner ............ B29C 45/14073
29/527.1

(Continued)

FOREIGN PATENT DOCUMENTS

CN 1219463 6/1999
CN 105269767 1/2016

(Continued)

OTHER PUBLICATIONS

Machine English translation of DE641593 provided by Google Patent (Year: 1937).*

(Continued)

*Primary Examiner* — Edmund H Lee
(74) *Attorney, Agent, or Firm* — Williams Mullen; Thomas F. Bergert

(57) ABSTRACT

The invention relates to a device (10) for shaping an elongated component (44), comprising:
a shaping tool (12) that defines multiple molding points and delimits at least one cavity (20) in which the molding compound (18) introduced via the molding points can be received,
at least one centering element (26) which is designed to receive an elongated component (22, 24) and guide same into the at least one cavity (20), wherein the at least one centering element (26) can be moved relative to the molding tool (12), and
at least one drive device, by means of which the at least one centering element (26) can be driven so as to move relative to the molding tool (12).

7 Claims, 7 Drawing Sheets

(56) References Cited

U.S. PATENT DOCUMENTS

| | | | |
|---|---|---|---|
| 4,810,184 A | | 3/1989 | Gellert et al. |
| 10,137,618 B2* | | 11/2018 | Hutter ................. B29C 45/03 |
| 2002/0024169 A1* | | 2/2002 | Nishizawa .......... B29C 45/0013 |
| | | | 425/174 |
| 2014/0110882 A1* | | 4/2014 | Aase ..................... H02G 15/18 |
| | | | 264/278 |
| 2016/0375617 A1* | | 12/2016 | Hutter ................... B29C 45/33 |
| | | | 425/116 |
| 2020/0016804 A1* | | 1/2020 | Wenzel ................ B29C 48/154 |

FOREIGN PATENT DOCUMENTS

| | | | |
|---|---|---|---|
| DE | 641593 C | | 2/1937 |
| DE | 4136728 | | 5/1993 |
| FR | 2055248 A5 | | 5/1971 |
| JP | S6157316 A | | 3/1986 |
| JP | 11019972 | * | 1/1999 |
| JP | 2012121251 A | | 6/2012 |
| WO | 2009041915 A1 | | 4/2009 |

OTHER PUBLICATIONS

International Search Report and Written Opinion for PCT/EP2019/058648, European Patent Office, Jun. 25, 2019.

Chinese Office Action for CN Application No. 201980034522.4, China National Intellectual Property Administration, dated Jan. 4, 2022.

* cited by examiner

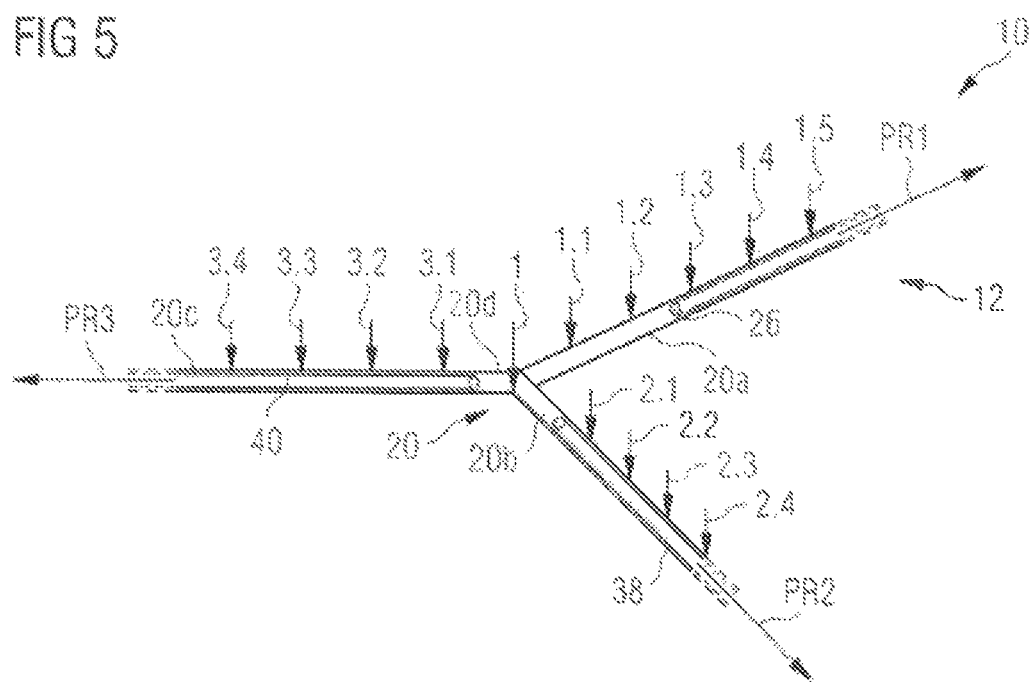
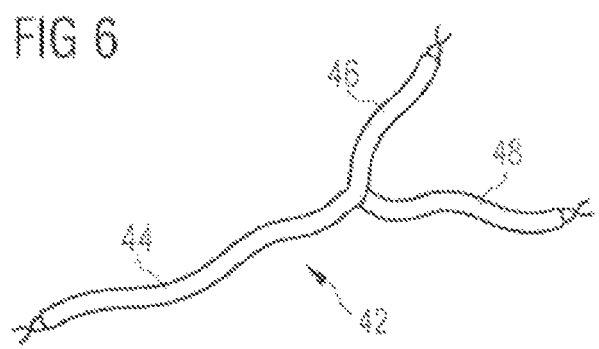

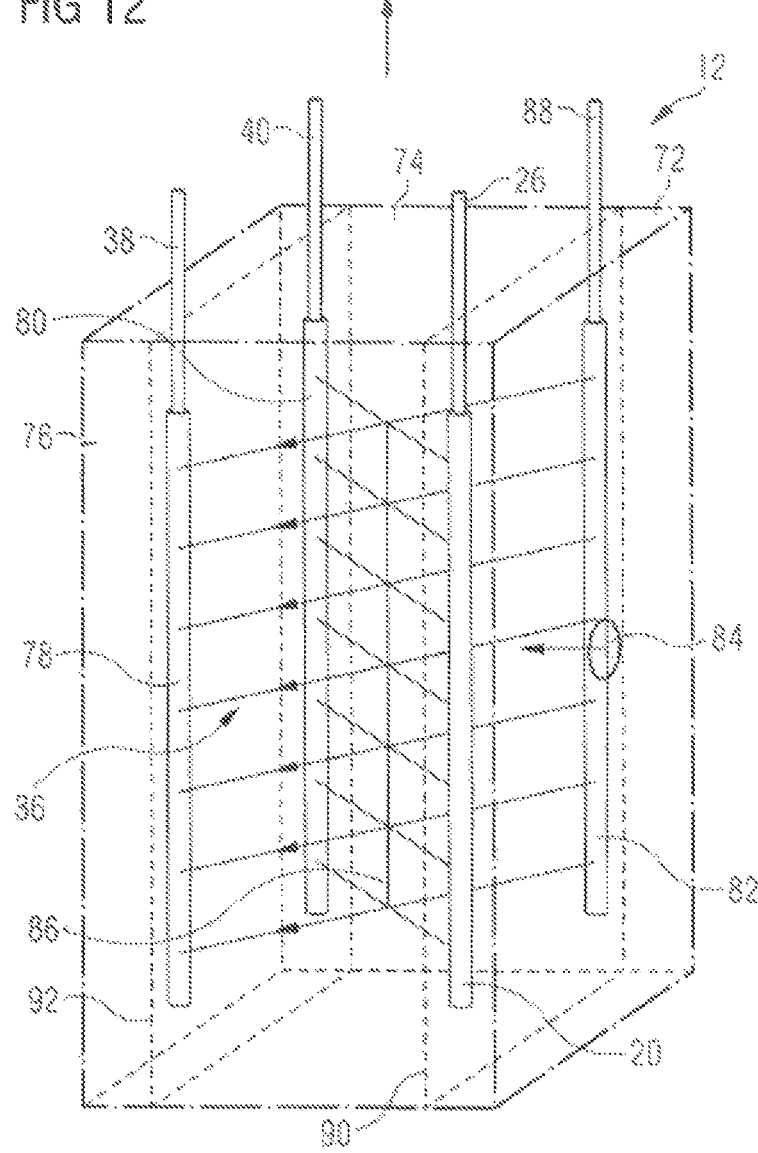

DEVICE FOR SHAPING AN ELONGATED COMPONENT

CROSS-REFERENCE TO RELATED APPLICATIONS

This application is the U.S. national phase of international application PCT/EP2019/058648, filed on Apr. 5, 2019, which claims the benefit of German application DE 10 2018 112 334.5 filed on May 23, 2018; all of which are hereby incorporated herein in their entirety by reference.

The present invention relates to a device and a method for shaping an elongated component. The shaping may be extrusion coating or sheathing. The elongated component may comprise, for example, a cable core, a stranded composite, at least one conductor and/or at least one core and generally form an elongated insert.

When shaping elongated components by means of various injection molding processes, the components may be deformed due to the injection pressure acting on them via the molding compound or pressed into zones in a cavity of a molding tool in which a lower injection pressure prevails. Thus, significant problems are associated with the positioning of an elongated component in a cavity of a molding tool. In order to eliminate these positioning problems, it is known to position or center the components in the cavity of the molding tool by means of retaining pins or slide elements. These additional elements make the construction of the molding tool considerably more complex, whereby it is not possible, even with these additional elements, to reliably center, in particular, pliable components.

There is a need for a device and a method for shaping an elongated component, with which it is possible to reliably center a component in a cavity in a cost-effective manner.

Such a need is met by the subject matter of the claims.

According to one aspect, a device for shaping an elongated component is provided. The device comprises:

a molding tool that defines multiple molding points and delimits at least one cavity in which the molding compound introduced via the molding points may be received, at least one centering element which is designed to receive an elongated component and to guide it into the at least one cavity, the at least one centering element being movable relative to the molding tool, and at least one drive device by means of which the at least one centering element may be driven for relative movement relative to the molding tool.

Due to the relative movement of the at least one centering element by means of the at least one drive device relative to the molding tool, the at least one centering element may also be moved relative to the molding points. The at least one centering element may be moved out of the at least one cavity or out of the molding tool by means of the at least one drive device.

The molding compound may be a plastic material or a plastic material mixture. The molding compound may be supplied essentially in liquid form and then solidify to form an object or a component casing.

The at least one drive device may drive the at least one centering element hydraulically, pneumatically or electrically. The drive device may control the speed of the relative movement of the at least one centering element relative to the molding tool, The drive device may control the speed of the relative movement of the at least one centering element in such a way that the relative movement takes place with a predetermined speed characteristic. The speed characteristic may run straight at least in sections, i.e., the speed remains essentially constant. The speed characteristic may also increase linearly at least in sections or also have jumps. For example, the at least one centering element may be moved very quickly between two successive molding points at a high speed and may approach the following molding point at a low speed. The speed at which the at least one centering element is moved may depend on the design or the structure of the component to be produced or of the component to be shaped. The relative movement of the at least one centering element may also be controlled in such a way that the centering element pauses at predetermined positions, i.e., the speed of the centering element is zero. The speed characteristic may also be tacked together from different sections. For example, the speed characteristic may have jumps, linearly increasing sections and also sections having a constant speed. The at least one centering element may also stop or pause in order to wait for an area of the molding tool to be filled before the relative movement of the at least one centering element is advanced further.

The relative movement of the at least one centering element relative to the molding tool as a function of time and/or position may be controlled by means of the at least one drive device. The relative movement of the at least one centering element may be controlled in such a way that the at least one centering element reaches predetermined positions within the molding tool at predetermined points in time. For example, the at least one centering element may stop at predetermined positions in the cavity in order to pause. This can take place, for example, if the further relative movement of the centering element depends on the filling state of the cavity. The relative movement of the at least one centering element may furthermore be controlled in such a way that the next section of the relative movement of the centering element is initiated only when the at least one centering element has reached a predefined position in the cavity.

The centering element may be elongated and/or tubular, or at least have a section designed in this way. The centering element may support the component or contact it directly. For this purpose, the centering element may at least partially surround the component or, in other words, receive and guide it in a hollow section. The at least one centering element may have a round or polygonal cross section. The at least one centering element may have an oval, elliptical or also a circular cross section. Furthermore, the at least one centering element may have a triangular, square, hexagonal or n-cornered cross section. The cross section of the at least one centering element may, for example, also have two parallel edges which are connected to one another via curved or rounded areas. The cross section of the at least one centering element may be matched to the shape or to the cross section of the component to be molded. The component to be molded may, for example, also be a so-called flat conductor. The cross section of the at least one centering element may be matched to the cross section of the flat conductor. The cross section of the at least one centering element, which is matched to a flat conductor may, for example, be rectangular or have parallel edges that are connected to one another via curved sections.

The at least one centering element may have an end with a predetermined contour. From this end, the elongated component may emerge from the at least one centering element in the cavity or may be released from the centering element in the cavity via this end. The end of the at least one centering element may, for example, extend obliquely to the longitudinal axis of the centering element. The end of the at least one centering element may also extend essentially perpendicularly to the longitudinal axis of the centering element. However, other contours for the end of the at least one centering element are also conceivable. The end may have a beveled section and a section that runs essentially perpendicularly to the longitudinal axis and adjoins the beveled section. The end may be stepped or curved, for example. The centering element may further comprise an end area in order to introduce the elongated component into the centering element. The component, once it has been introduced into the centering element, may be centered in the cavity using the centering element.

The device may have several centering elements. The centering dements may have the same cross section or different cross sections. One centering element, for example, may have a round cross section and another centering element may have a rectangular cross section. In addition to the cross section, the centering elements may also differ in their diameter, the cross section and the diameter of the centering element depending on the component to be centered via the centering element. The centering dements may, in particular, have a different inner diameter. Each of the centering dements may be moved relative to the molding tool by means of the at least one drive device. The centering dements may be moved out of the mold or at least out of the at least one cavity. In this way, components having branches or the like may be molded, for example.

The molding tool may have two mold halves capable of being separated at a plane of separation. In the dosed state of the molding tool, the two mold halves may define the at least one cavity. Alternatively, the molding tool may also be designed in several parts. The molded parts of the molding tool may then define at least one cavity in the assembled state. The molding tool may define several cavities. At least one elongated component may be introduced into each cavity in the mold by means of at least one centering element. The centering element assigned to this cavity may be removed from each of the cavities by a relative movement of the centering element relative to the molding tool. The molding tool may have several planes of separation at which the individual molded parts of the molding tool may be separated from one another. The cavities may, for example, be situated next to one another in a plane of separation. For example, such a molding tool may be a so-called stack mold. The molding tool may be separated at the planes of separation in order to be able to remove a finished molded component from the molding tool.

Each molding point may have a needle valve nozzle. The needle valve nozzles may be controllable. The needle valve nozzles may be controlled as a function of the relative movement of the at least one centering element. One of the needle valve nozzles may be opened or dosed as a function of the position of the at least one centering element in the molding tool. The point in time at which the needle valve nozzle is opened may depend on the position of the at least one centering element relative to the needle valve nozzle. For example, the needle valve nozzle may be opened when the at least one centering element has reached a predetermined position relative to this needle valve nozzle in the cavity. The predetermined position may be located directly at the needle valve nozzle, but may also be at a predetermined distance from the needle valve nozzle. If, for example, there are several needle valve nozzles or several molding points on the path of the at least one centering element, these needle valve nozzles may be opened one after the other when the centering element moves through the positions of the needle valve nozzles one after the other during the relative movement relative to the mold.

The device may also have at least one control unit. The at least one control unit may control the at least one drive device in order to be able to control the relative movement relative to the molding tool of the at least one centering element by means of the drive device. For this purpose, the control unit may be coupled to the at least one drive device. The at least one control unit may also control the needle valve nozzles assigned to the molding points. The at least one control unit may, in particular, control the opening times, the closing times and the opening duration of each needle valve nozzle individually for each needle valve nozzle. The opening of the needle valve nozzles may be controlled by the at least one control unit as a function of the relative movement of the at least one centering element relative to the molding tool.

The device may generally be based on an injection molding principle or be designed to carry out an injection molding process or at least an injection molding-like process. The device may, in particular, be connected to known injection units or screw arrangements of an injection molding machine for this purpose. As explained below, the objects produced may, in particular, be sheathed cables, the supplied molding compound solidifies to form a corresponding sheathing.

According to a further aspect, a method for shaping an elongated component is provided. The method consists of the following steps:

Guiding at least one component into at least one cavity having at least one centering element;

Feeding a molding compound into the at least one cavity via at least one of the molding points defined by the molding tool; and Moving the at least one centering element relative to the molding tool.

The individual steps of the method may be carried out at least partially in parallel with one another. For example, the molding compound may be supplied in parallel or at the same time as the relative movement of the centering element relative to the molding tool.

The opening and dosing of the needle valve nozzles provided at the molding points may be controlled as a function of the relative movement of the at least one centering element relative to the molding tool.

It is understood that the method may comprise further steps in order to implement any of the aforementioned effects, working steps and/or operating states of the device.

The elongated component may generally be an insert and, in particular, a cable. In other words, the centering element may be designed to align the elongated component in such a way that it extends essentially concentrically through the cavity.

The device described and also the method described may be used, in particular, for a cascade injection molding process.

The terms used here serve only to describe individual embodiments and are not intended to be considered as a limitation. Unless defined otherwise, all technical and scientific terms used here have the meaning that corresponds to the general understanding of the person skilled in the art in the field relevant to the present disclosure; they are to be neither too broadly nor too narrowly understood. If technical terms are used incorrectly and thus do not express the technical ideas of the present disclosure, these are to be replaced by technical terms that provide the person skilled in the art with a correct understanding. The general terms used here are to be interpreted on the basis of the definition in the lexicon or appropriate to the context; a too narrow interpretation should be avoided here.

The terms such as "comprise" or "have" etc., mean that the described features, numbers, acts, components, parts or combinations thereof are present and include the presence or possible addition of one or multiple further features, numbers, acts, components, parts or their combinations.

Although terms such as "first" or "second," etc., may be used to describe various components, these components should not be limited to these terms. The above terms are only intended to distinguish one component from the other. For example, a first component may be referred to as a second component without departing from the scope of the present disclosure; a second component may also be referred to as a first component. The term "and/or" encompasses both combinations of the plurality of related objects as well as each object of this plurality of the described plurality of objects.

If in the present case it is stated that a component is "connected" to another component, so that it is "connected" or "accesses it," this may mean that it is directly connected to it or accesses it directly; it should be noted here, however, that a further component may be in between. On the other hand, if it is stated that one component is "directly connected" to another component or "directly accesses it," this is to be understood to mean that there are no further components in between.

Specific embodiments of the present disclosure will be described below with reference to the accompanying drawings; components of the same type are always provided with the same reference signs. In the description of the present disclosure, detailed explanations of known associated functions or constructions are dispensed with insofar as these unnecessarily detract from the meaning of the present disclosure; however, such functions and constructions are understandable to the person skilled in the art. The accompanying drawings of the present disclosure serve to illustrate the present disclosure and are not to be interpreted as limiting. The technical concept of the present disclosure is to be interpreted in such a way that, in addition to the attached drawings, it also includes all such modifications, changes and variants.

Further aims, features, advantages and possible applications emerge from the following description of non-limiting exemplary embodiments with reference to the associated drawings. All of the features described and/or depicted in the figures, individually or in any combination, show the subject matter disclosed herein, even regardless of their grouping in the claims or their references. The dimensions and proportions of the components shown in the figures are not necessarily to scale here; in the case of embodiments to be implemented, they may deviate from what is illustrated here. Therein:

FIG. 5 shows a schematic view of a device according to a third embodiment;

FIG. 6 shows a schematic view of an exemplary component;

FIG. 12 shows a schematic view of a multi-part molding tool.

The exemplary embodiments of the device and also the method described may be used, in particular, for a cascade injection molding process. A cascade injection molding process is a sequential injection molding process, in which several needle valve nozzles are used, which may be controlled independently of one another. The needle valve nozzles may, in particular, be opened and dosed independently of one another. The filling of the at least one cavity may be controlled individually via the needle valve nozzles, via which the component may be injected at several points distributed over its geometry.

Figure 1:
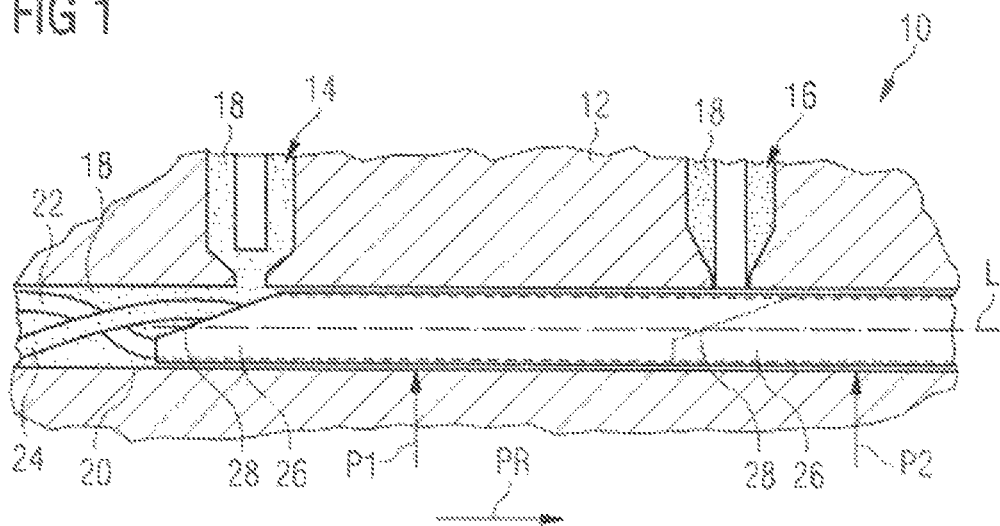
FIG. 1 shows a schematic view of a device according to a first embodiment.

FIG. 1 shows a schematic view of a device for shaping an elongated component according to a first embodiment. The device is generally denoted by 10.

The device 10 includes a molding tool 12. In the detail of the molding tool 12 shown in FIG. 1, two molding points are formed, each of which includes a needle valve nozzle 14 and 16. Molding compound 18 may be introduced into a cavity 20 defined by the molding tool 12 via the needle valve nozzles 14 and 16. The elongated components 22 and 24 which, according to this embodiment, are cable cores, are apparent in the cavity 20. In the area of the cavity 20 on the left in FIG. 1, the cable cores 22 and 24 have already been sheathed with the molding compound 18 introduced into the cavity 20 via the needle valve nozzles 14.

The elongated components 22 and 24 are centered in the cavity 20 via a tubular centering element 26. The centering element 26 is movable relative to the molding tool 12, as is shown by the positions P1 and P2 of the centering element 26 in the cavity 20. The centering element 26 may accordingly also be moved relative to the needle valve nozzles 14 and 16. The tubular centering element 26 may be driven by a drive device (not shown in FIG. 1) for relative movement relative to the molding tool 12. The molding tool 12 remains stationary in its position during the injection molding process and cannot be moved relative to the centering element 26 at least during the injection molding process.

In addition, the relative movement relative to the molding tool 12 may be controlled or regulated so that the relative movement of the centering element 26 may be controlled or regulated with a predetermined speed characteristic and/or as a function of time. For this purpose, a control unit (not shown) may be coupled to the drive device or encompassed by the drive device. Furthermore, the control unit may also control the opening times and the dosing times and/or the opening duration and the opening duration of the needle valve nozzles 14 and 16.

The centering element 26 at the position P1 is located on or in the area of the needle valve nozzle 14. The elongated components 22 and 24 are released by the centering element 26 to such an extent that the components 22 and 24 are able to be encased with the molding compound 18 injected by the needle valve nozzle 14. The needle valve nozzle 14 is open in FIG. 1 in order to be able to introduce the molding compound 18 into the part of the cavity 20 released by the centering element 26 and to be able to shape the components 22 and 24 into the molding compound 18. The centering element 26 is moved from the position P1 into the position P2 relative to the molding tool 12. The centering element 26 is located on the needle valve nozzle 16 in position P2. The needle valve nozzle 16 is shown in FIG. 1 in the closed state. In order to move from position P1 to position P2, the centering element 26 is moved in the direction of the arrow PR relative to the molding tool 12, and thus also relative to the needle valve nozzles 14 and 16. The centering element 26 is driven in the direction of the arrow PR, which means that the centering element 26 is moved out of the molding tool 12. Before the actual injection molding process, the elongated components 22, 24 with the centering element 26 may also be guided into the molding tool 12 relative to the molding tool 12 in order to be able to position or center the elongated components 22 and 24 in the center of the cavity 20.

In the embodiment shown in FIG. 1, the centering element 26 has an end 28 which is beveled in sections. The end 28 of the centering element 26 extends in sections at an angle to the longitudinal axis L of the centering element 26 and also has a section that runs perpendicularly to the longitudinal axis L. The vertical section adjoins the beveled section. The end 28 of the centering element may, however, also be designed differently.

Figure 2:
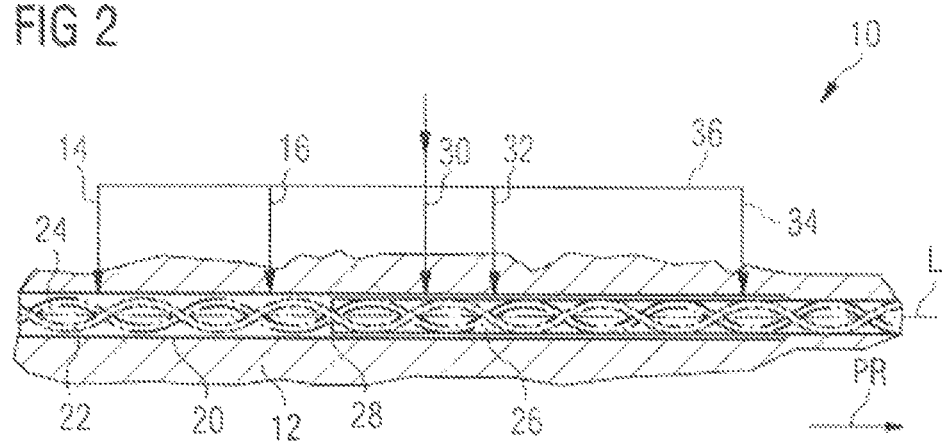
FIG. 2 shows a schematic view of a device according to a second embodiment.

FIG. 2 shows a schematic view of a device 10 according to a second embodiment. The device 10 includes the molding tool 12 in which molding points are formed, each of which includes a needle valve nozzle 14, 16, 30, 32 and 34. The needle valve nozzles 14, 16, 30, 32 and 34 are charged with a molding compound (not shown) via a hot runner system 36. The hot runner system 36 has a plurality of hot runners that guide the molding compound to the needle valve nozzles 14, 16, 30, 32 and 34. The cavity 20 in which the elongated components 22 and 24 are apparent, is formed in the molding tool 12. The elongated components 22 and 24 are centered in the cavity 20 via the centering element 26. The centering element 26 may be driven for relative movement relative to the molding tool 12 in the direction indicated by the arrow PR. The direction PR is directed out of the molding tool 12, In the illustration according to FIG. 2, the needle valve nozzles 14, 16 have already been released by the centering element 26 due to the relative movement of the centering element 26, so that the molding compound may be introduced into the cavity 20 via the needle valve nozzles 14 and 16. The opening and closing of the needle valve nozzles 14, 16, 30, 32 and 34 may be controlled as a function of the relative movement of the centering element 26. The needle valve nozzles 14, 16, 30, 32 and 34 may, for example, be opened each time the centering element 26 has reached a predetermined position relative to the respective needle valve nozzle 14, 16, 30, 32 and 34. This predetermined position may be located directly at the respective needle valve nozzle 14, 16, 30, 32 and 34 or also at another location within the cavity 20. The opening times, closing times and the opening duration of each needle valve nozzle 14, 16, 30, 32 and 34 may be controlled as a function of the respective geometry of the component to be produced.

For example, the opening time of one of the needle valve nozzles 14, 16, 30, 32 and 34 may be matched to the position of the centering element 26 in the cavity. The corresponding needle valve nozzle 14, 16, 30, 32 and 34 opens only when the centering element 26 has reached the predetermined position relative to the corresponding needle valve nozzle 14, 16, 30, 32 and 34. If the area of the cavity 20 in front of the centering element 26, i.e., the part of the cavity 20 released by the centering element 26, is sufficiently filled with molding compound, the centering element 26 may be further moved relative to the molding tool 12 or further relative to the needle valve nozzles 14, 16, 30, 32 and 34. This newly released part of the cavity 20 from the needle valve nozzle 14, 16, 30, 32 and 34, which is assigned to this part of the cavity 20, may be filled with molding compound (not shown in FIG. 2) as soon as the corresponding needle valve nozzle 14, 16, 30, 32 and 34 is opened. The centering element 26 in FIG. 2 may, for example, be moved relatively from the position shown in FIG. 2 into a position at the needle valve nozzle 30 or into a position between the needle valve nozzles 30 and 32, so that the newly released part of the cavity 20 may then be filled with molding compound, for example, via the opened needle valve nozzles 16 and 30.

Figure 3:
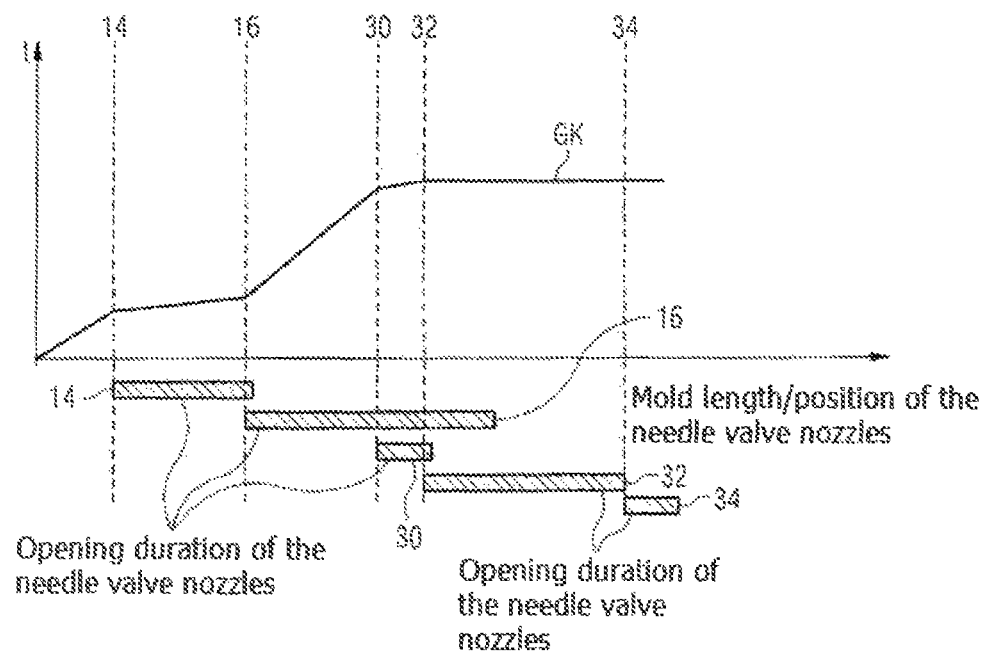
FIG. 3 shows a diagram with a speed characteristic of the centering element of the device according to FIG. 2.

FIG. 3 shows an exemplary speed characteristic GK, with which the centering element 26 may be moved between the needle valve nozzles 14, 16, 30, 32 and 34 according to FIG. 2. The speed of the centering element 26 may be regulated or controlled via the drive device (not shown) and/or with a control unit (not shown) connected to the drive device. The speed of the centering element 26 increases linearly and relatively strongly to as far as the needle valve nozzle 14. Between the needle valve nozzles 14 and 16, the speed continues to increase slightly in a linear manner, before it increases in a relatively strong linear manner from the needle valve nozzle 16 to the needle valve nozzle 30. The speed of the centering element 26 between the needle valve nozzles 30 and 32 is increased slightly further. Between the needle valve nozzles 32 and 34, the speed from the needle valve nozzle 32 remains essentially constant. The relative movement of the centering element 26 may, however, also be controlled with other speed characteristics. For example, the centering element 26 may also stop at predetermined positions in the cavity in order to pause. Furthermore, the speed characteristic may also have jumps, in which the speed of the centering element is greatly increased in a short period of time.

The opening time of the individual needle valve nozzles 14, 16, 30, 32 and 34 is also shown in FIG. 3. The needle valve nozzles 14, 16, 30, 32 and 34 are opened when the centering element 26 has reached a position at or near the corresponding needle valve nozzle 14, 16, 32, 32 and 34. The opening times of the needle valve nozzles 14, 16, 30, 32 and 34 may also overlap, i.e., one of the needle valve nozzles may remain open even though the next needle valve nozzle has already been opened. Several needle valve nozzles may also be open at the same time. In the exemplary illustration according to FIG. 3, for example, the needle valve nozzle 16 remains open even when the needle valve nozzles 30 and 32 are open. The needle valve nozzle 16 even remains open even beyond the point in time when the needle valve nozzle 30 doses. As previously mentioned, the opening time of the individual needle valve nozzles 14, 16, 30, 32 and 34 depends, among other things, on the geometry of the component to be produced.

Figure 4:
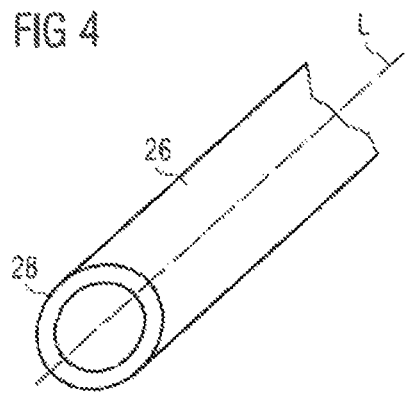
FIG. 4 shows a perspective view of a centering element having a beveled end.

FIG. 4 shows a schematic representation of a tubular centering element 26 with a beveled end 28.

FIG. 5 shows a schematic view of a molding tool 12 which defines a cavity 20. The cavity 20 has three sections or branches 20a, 20b and 20c, which extend from a central region 20d of the cavity 20 in the molding tool 12. In each of the sections 20a, 20b, 20c of the cavity 20, several molding points with needle valve nozzles 1.1-1.5, 2.1-2.4 and 3.1-3.4 are provided. In the central area 20d of the cavity 20, in which the sections 20*a*, 20*b* and 20*c* converge, a molding point with a needle valve nozzle 1 is also provided. A centering element 26, 38, 40 is assigned to each section 20*a*, 20*b* and 20*c*. As soon as the central area 20*d* of the cavity 20 is filled with molding compound from the needle valve nozzle 1, the centering elements 26, 38 and 40 are driven and moved relative to the molding tool 12 or to the needle valve nozzles 1.1-1.5, 2.1-2.4 and 3.1-3.4 in the direction of the arrows PR1, PR2 and PR3 out of the molding tool 12. The opening times, closing times and also the opening duration of the individual needle valve nozzles 1.1-1.5, 2.1-2.4 and 3.1-3.4 may be controlled individually for each of the needle valve nozzles 1.1-1.5, 2.1-2.4 and 3.1-3.4.

FIG. 6 shows a view of an exemplary component 42 that may be produced with the device 10 according to FIG. 5. The component 42 is a cable. The cable has a main section 44, which is divided into two cable branches 46 and 48.

Figure 7:
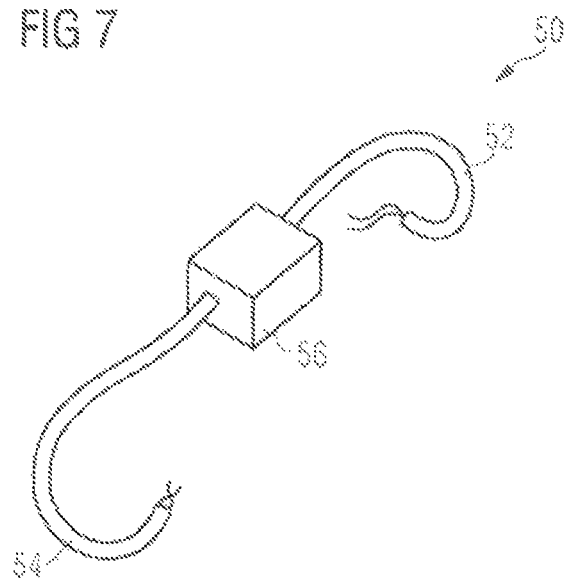
FIG. 7 shows a schematic view of a further exemplary component.

FIG. 7 shows a schematic view of a further exemplary component 50. The component 50 has two cable branches 52 and 54, which extend starting from a cuboid section 56. An electronic component connected to the cable cores in the cable branches 52 and 54 may be molded in this cuboid section 56.

Figure 8:
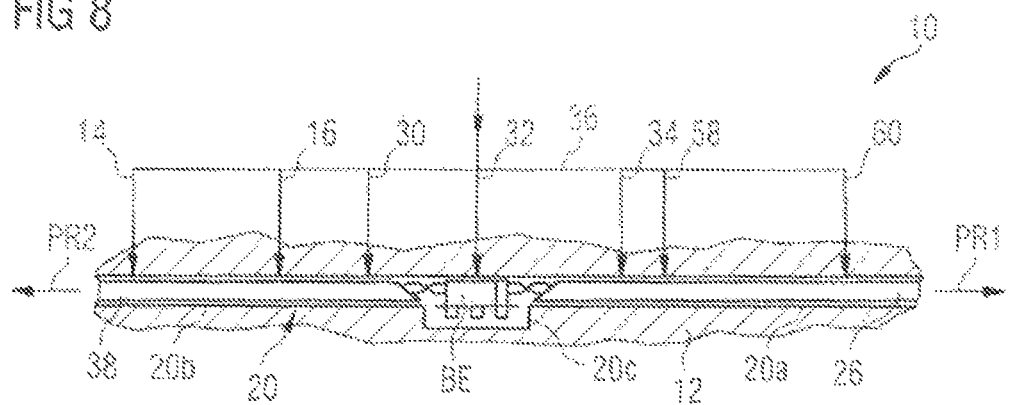
FIG. 8 shows a schematic view of a device according to a fourth embodiment, which is designed for producing the component according to FIG. 7.

FIG. 8 shows a schematic view of a device 10, with which the component according to FIG. 7 may be produced. The device 10 includes a molding tool 12 which defines a cavity 20. The cavity 20 has two sections 20*a* and 20*b* which extend from the central section 20*c*. Apparent in the section 20*c* is the electronic component BE, which is to be shaped into the cuboid section 56 of the component 50 (see FIG. 7). A centering element 26 and 38 has been introduced into each of the sections 20*a* and 20*b* of the cavity 20. The centering elements 26 and 38 center the cable cores in the sections 20*a* and 20*b* of the cavity 20 and positioning cable cores at the central area 20*c* of the cavity 20 with the electronic component BE.

The molding tool 12 has seven molding points, each of which is provided with a needle valve nozzle 14, 16, 30, 32, 34, 58 and 60. The needle valve nozzles 14, 16, 30, 32, 34, 58 and 60 are supplied with molding compound via a hot runner system 36. The centering elements 26 and 38 are moved in the direction of the arrows PR1 and PR2 relative to the molding tool 12. The centering elements 26 and 38 are thus moved in the opposite direction relative to the molding tool 12 out of the molding tool 12. The needle valve nozzle 32 fills the central section 20*c* of the cavity 20, with which the cuboid section 56 of the component 50 (see FIG. 7) is to be produced. As soon as the section 20*c* of the cavity 20 is sufficiently filled with molding compound, the centering elements 26 and 38 are moved relative to the molding tool 12 and the needle valve nozzles 14, 16, 30, 32, 34, 58 and 60 in the sections 20*a* and 20*b* of the cavity 20 are activated in order to fill the parts released by the centering elements 26 and 38, the sections 20*a* and 20*b*, with molding compound.

Figure 9:
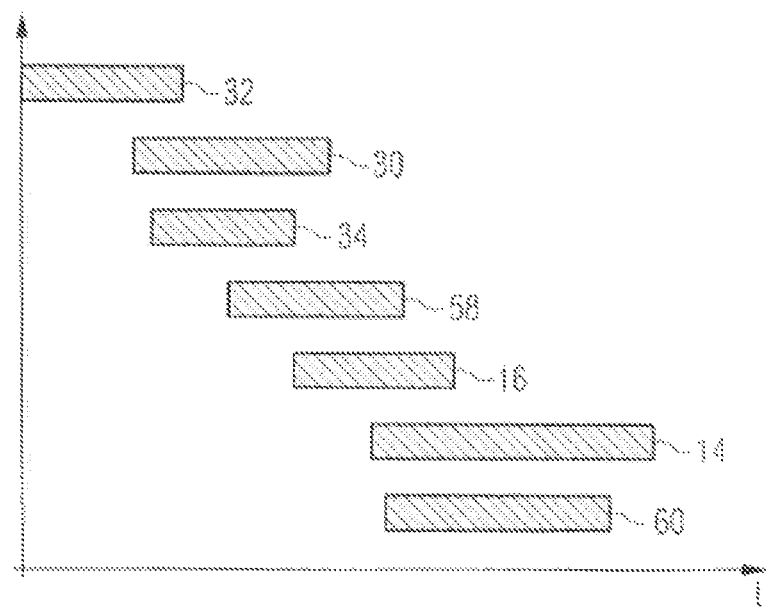
FIG. 9 shows a diagram with the opening times of the needle valve nozzles of the device according to FIG. 8.

FIG. 9 shows an example of the respective opening duration of the needle valve nozzles 14, 16, 30, 32, 34, 50 and 58. The opening times are also apparent in the schematic diagram. Initially, the needle valve nozzle 32 is opened, which injects the molding compound into the central area 20*c* of the cavity 20. The two needle valve nozzles 30 and 34 closest to the central region 20*c* of the cavity 20 are subsequently opened one after the other in the sections 20*a* and 20*b* of the cavity 20. The needle valve nozzles 58 and 60 are then opened, the needle valve nozzle 58 being opened first. Finally, the needle valve nozzle 14 and then the needle valve nozzle 16 are opened. The opening times, closing times and the opening duration of the needle valve nozzles 14, 16, 30, 32, 34, 50 and 58 depend on the geometry of the components to be produced. In the exemplary component according to FIG. 7, the opening times, the closing times and the opening duration may, for example, depend on the geometry, i.e., for example, on the dimensions of the cuboid section 56, the diameter and/or the cross section of the component sections 52 and 54 to be produced in the sections 20*a*, 20*b* of the cavity 20 (see FIG. 7).

Figure 10:
FIG. 10 shows a schematic view of a further exemplary component.

FIG. 10 shows a schematic view of a component 62. In the component 62, the cable cores 20, 24 or the elongated components have been molded into two different components. The section 64 has been shaped with a first component, whereas the section 66 is shaped with a second component.

Figure 11A:
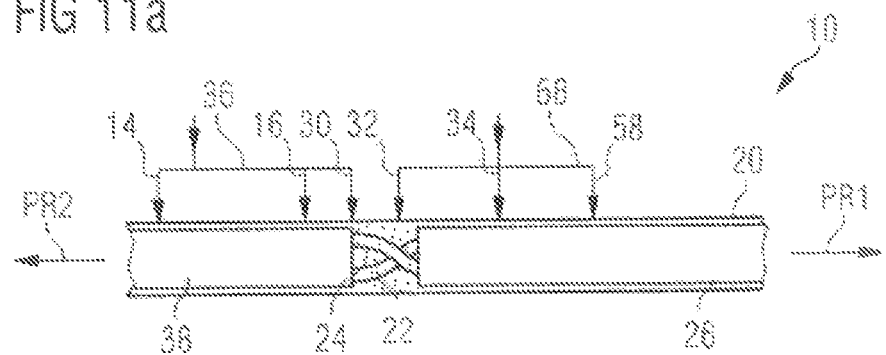
FIGS. 11a to 11c show schematic views of a device according to a fifth embodiment, which show various method steps in the production of the component according to FIG. 10.
Figure 11B:
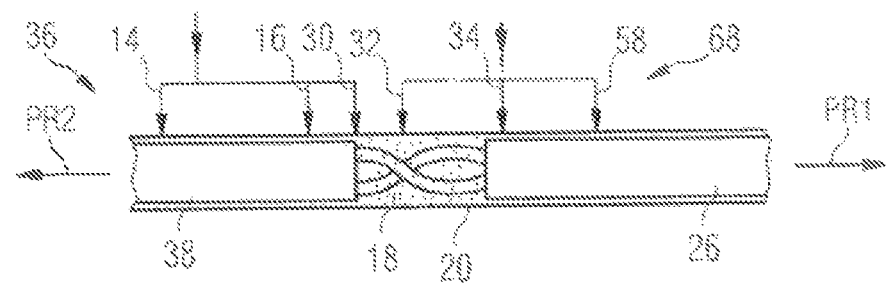
Figure 11C:
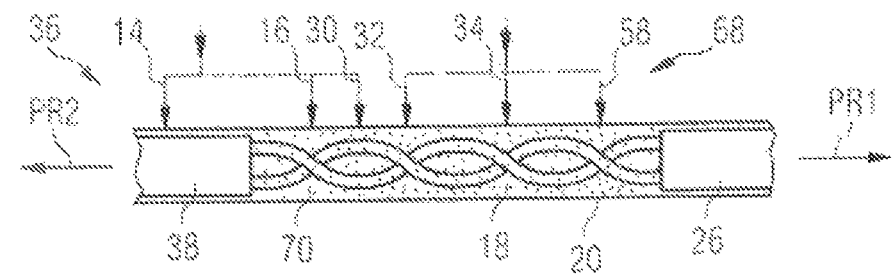

FIGS. 11*a* to 11*c* show schematic views of a device 10, which is designed for producing the component 62 according to FIG. 10. FIG. 11*a* shows the initial state of the device 10. The cable cores 22 and 24 are centered in the cavity 20 via the two centering elements 26 and 38. Molding compound composed of different components may be introduced into the cavity 20 via two separate hot runner systems 36 and 68. The needle valve nozzles 14, 16 and 30 are assigned to the first hot runner system 36. The needle valve nozzles 32, 34 and 58 are assigned to the second hot runner system 68. With the hot runner systems 36 and 68, two different components for shaping the cable cores 22 and 24 may be introduced into the cavity 20. The two components may, for example, be different materials or the same materials having different degrees of hardness. Components with different colors may also be used. It is also possible to use the same materials that are chemically/physically foamed and not foamed.

FIG. 11*b* shows the device 10 during the first production step. The first component is fed to the needle valve nozzle 32 via the hot runner system 68. The needle valve nozzle 32 is open and injects the molding compound 18 into the cavity 20. The centering element 26 is moved in the direction of the arrow PR1 relative to the needle valve nozzles 18, 34 and 58 simultaneously to the opening of the needle valve nozzle 32 or with a time delay after the opening of the needle valve nozzle 32, so that the part of the cavity 20 released by the centering element 26 from the needle valve nozzle 32 may be filled with the molding compound 18.

FIG. 11*c* shows the device 10 during the next production step. The centering element 26 has been moved further relative to the needle valve nozzles 32, 34, 58. The needle valve nozzles 32, 34 and 58 are or were open, in order to introduce the molding compound 18 consisting of the first component into the cavity 20. At the same time, the molding compound 70 consisting of the second component is introduced into the cavity 20 via the hot runner system 36 and the open needle valve nozzles 30 and 16. For this purpose, the centering element 38 has been moved relative to the needle valve nozzles 16, 30 and 32 so that the molding compound 70 consisting of the second component may be introduced into the cavity 20. The centering element 38 is located between the needle valve nozzles 14 and 16. The needle valve nozzle 14 has not yet been opened according to FIG. 11*c*. The needle valve nozzle 14 is only opened after a further relative movement of the centering element 38, i.e., when the centering element 38 is located in the vicinity of the needle valve nozzle 14 or at the needle valve nozzle 14.

FIG. 12 shows a schematic view of a multiple molding tool 12. The multiple molding tool 12 is composed of several molding parts 72, 74 and 76. The molding parts 72, 74 and 76 define four cavities 20, 78, 80 and 82. A hot runner system 36 is formed in the molding tool 12, via which the molding compound may be introduced into the cavities 20, 78, 80 and 82. The hot runners of the hot runner system 36 are supplied with molding compound via central distribution channels 84 and 86. A centering element 26, 38, 40 and 88 may be accommodated in each cavity 20, 78, 80 and 82. The centering elements 26, 38, 40 and 88 may be moved in the direction of the arrow PR relative to the molding tool 12. The centering elements 20, 38, 40 and 88 may be moved out of the molding tool 12 in the direction of the arrow PR. The molded parts 72, 74 and 76 may be separated from one another at the planes of separation 90 and 92, in order to be able to remove the finished components from the molding tool 12.

With the device 10, it is possible to center pliable components, such as the cable cores 22 and 24, in the cavity 20 of the molding tool 12, due to the centering element 26 and its relative movement relative to the molding tool 12. The component 22, 24 to be shaped is only released from the centering element 26 immediately before the melt front of the molding compound 18, i.e., the component 22, 24 to be molded is surrounded by the molding compound 18 immediately after departing the centering element 26. The components 22, 24 may thus hold their predetermined position in the cavity 20 and are not deformed due to the injection pressure or pressed against the edge of the cavity 20.

The speed of the relative movement of the centering element 26 relative to the molding tool 12 may be controlled or regulated via the drive device and/or a control unit. The centering element 26 may thus be controlled in such a way that it may follow or run ahead of the melt front of the molding compound 18 in a defined manner. A wide variety of speed characteristics may be implemented with the centering element 26. For example, the centering element 26 may be moved rapidly between two needle valve nozzles such as, for example, the needle valve nozzles 14, 16, and very slowly in the following section after the needle valve nozzle 16 to the next needle valve nozzle 30. The control of the speed of the relative movement of the centering element 26 relative to the molding tool 12 depends, among other things, on the geometry of the component to be produced.

The opening times, closing times and the opening duration of the needle valve nozzles may be controlled as a function of the relative movement of the centering element 26. For example, one of the needle valve nozzles 14, 16, 30 may be opened only when the centering element 26 has reached a predetermined position relative to one of the needle valve nozzles 14, 16, 30. If the part of the cavity in front of the centering element 26, i.e., the part of the cavity 20 into which the centering element 26 does not penetrate or which has already been released by the centering element 26, is sufficiently filled with molding compound 18, the centering element 26 may be moved further and the part of the cavity 20 released by the centering element 26 may be filled with the molding compound. The filling of the part of the cavity 20 in front of the centering element 26 may be ascertained via the supplied volume of the molding compound and/or via the internal pressure of the mold. For example, the pressure generated by the molding compound 18 on the centering element 26 may be ascertained. This pressure may then be used to ascertain whether or not the free part of the cavity 20 or the part of the cavity 20 released by the centering element 26 is sufficiently filled with the molding compound 18. If the free or released part of the cavity 20 has been sufficiently filled and this is indicated by the pressure on the centering element 26, the centering element 26 may be moved further relative to the molding tool 12.

In the case of components to be shaped having a complex geometry or when molding components having a complex structure such as, for example, the electronic component BE according to FIG. 8, the elongated components are guided via the centering elements 26, 38 in the cavity 20 to the complex geometry of the component or to the complex component BE (see section 20c of the cavity 20 in FIG. 8). Starting from these starting points, the centering elements 26, 38 may then be moved relative to the molding tool 12 after the part of the cavity 20 (of section 20c, FIG. 8) in which the complex component BE is situated has been filled with molding compound 18.

It is possible to produce components having different diameters or cross sections in different sections 20a, 20b, 20c of the cavity 20 (see, for example, the components according to FIGS. 5 to 8), so that the finished component includes several sections having different diameters and/or sections differing in their cross sections, Furthermore, the component 50 shown, for example, in FIG. 7 may be produced from several components with the device 10. For example, the section 56 with the electronic component BE could be injection molded with a first component (for example, a harder component), and the two cable sections 52 and 54 with one or two further components (for example, softer components) that differ from the first component.

The mold separation may be virtually dispensed with via the device 10, since the needle valve nozzles 14, 16, 30 leave only a small point on the surface of the finished component at the molding points. In addition, the amount of waste may be reduced, since no line sprues are used for the molding points as in conventional injection molding processes.

The structure and construction of the molding tools 12 may be greatly simplified because the number of moving parts is reduced. This also results in a longer service life of the molding tools 12.

The aspects and features that have been mentioned and described, together with one or more of the examples and figures described in detail above, may further be combined with one or multiple of the other examples, in order to replace a similar feature of the other example or to also introduce the feature into the other example.

The description and drawings represent only the principles of the disclosure. In addition, all examples listed herein are expressly intended for teaching purposes only, in order to assist the reader in understanding the principles of the disclosure and the concepts contributed by the inventor (s) for the further development of the technology. All statements here about principles, aspects and examples of the disclosure, as well as particular exemplary embodiments thereof, are intended to include their equivalents.

Furthermore, the following claims are hereby incorporated into the detailed description, where each claim may stand on its own as a separate example. If each claim may stand on its own as a separate example, it should be noted that—although a dependent claim in the claims may refer to a particular combination with one or more other claims—other exemplary embodiments may also combine the dependent claim with the subject matter of each other dependent or independent claim. These combinations are suggested herein unless it is indicated that a particular combination is not intended. Furthermore, features of a claim are also intended to be included for every other independent claim, even if this claim is not made directly dependent on the independent claim.

The present disclosure is, of course, not limited in any way to the embodiments described above. On the contrary, many possibilities for modifications thereto will become apparent to the person of ordinary skill in the art without departing from the underlying concept of the present disclosure as defined in the appended claims.

The invention claimed is:

1. A device for shaping an elongated component, including:
   a molding tool which defines a plurality of molding points and delimits at least one cavity, in which the molding compound introduced via the molding points may be received,
   at least one centering element, which is designed to receive an elongated component and to guide it into the at least one cavity, the at least one centering element being movable relative to the molding tool, and
   at least one drive device, by means of which the at least one centering element may be driven for relative movement relative to the molding tool, wherein the at least one centering element has an end with at least a section extending obliquely to the longitudinal axis of the centering element.

2. The device according to claim 1, wherein the speed of the relative movement of the at least one centering element relative to the molding tool may be controlled by means of the at least one drive device.

3. The device according to claim 1, wherein the relative movement of the at least one centering element relative to the molding tool may be further controlled as a function of time by means of the at least one drive device.

4. A device according to claim 1, wherein the at least one centering element has a round, oval or polygonal cross section.

5. The device according to claim 1, wherein the device has a plurality of centering elements, each of the centering elements being movable relative to the molding tool by means of the at least one drive device.

6. The device according to claim 1, wherein the molding tool includes several cavities, into each of which at least one elongated component may be guided by means of at least one centering element.

7. The device according to claim 1, wherein each molding point includes a controllable needle valve nozzle.

* * * * *